United States Patent [19]
Selker et al.

[11] Patent Number: 5,485,482
[45] Date of Patent: Jan. 16, 1996

[54] METHOD FOR DESIGN AND CONSTRUCTION OF EFFICIENT, FUNDAMENTAL TRANSVERSE MODE SELECTED, DIODE PUMPED, SOLID STATE LASERS

[76] Inventors: Mark D. Selker, 3000 Powder Mill Rd., Adelphi, Md. 20783; Robert S. Afzal, 1615 Q. St., NW., Apt. 702, Washington, D.C. 20009

[21] Appl. No.: 165,781

[22] Filed: Dec. 8, 1993

[51] Int. Cl.$^6$ .................................................. H01S 3/091
[52] U.S. Cl. ................... 372/75; 372/69; 372/70; 372/71; 372/92
[58] Field of Search ................... 372/75, 69, 90, 372/92, 71

[56] References Cited

U.S. PATENT DOCUMENTS

| | | | |
|---|---|---|---|
| 4,710,940 | 12/1987 | Sipes, Jr. | 372/75 |
| 4,785,459 | 11/1988 | Baer | 372/75 |
| 4,972,427 | 11/1990 | Streifer et al. | 372/92 |
| 5,031,182 | 7/1991 | Anthon et al. | 372/69 |
| 5,081,637 | 1/1992 | Fan et al. | 372/72 |
| 5,123,026 | 6/1992 | Fan et al. | 372/75 |
| 5,315,612 | 5/1994 | Alcock et al. | 372/75 |

OTHER PUBLICATIONS

Th. Graf and J. E. Balmer, "High–power Nd; YLF laser end pumped by a diode laser bar", Aug. 15, 1993, vol. 8, No. 16 Optics Letters.

J. L. Dallas, M. D. Selker, "Nd:YLF Laser for Airborne/Spaceborne Laser Ranging", May 18, 1992, Eight International Workshop on Laser Ranging Instrumentation.

*Primary Examiner*—Georgia Y. Epps

[57] ABSTRACT

An efficient, fundamental transverse mode selected, diode pumped, solid state laser is disclosed. The laser consists of a slab of laser gain material such as Nd:YLF. Cavity forming optics are positioned around the slab of laser gain material. A laser diode bar, collimated by a micro-lens is used for side pumping a constrained gain region in the slab of laser gain material, with the dimensions transverse to the direction of beam propagation of the constrained gain region being smaller in at least one axis than the transverse dimensions of the fundamental transverse mode volume in the laser gain material. The cavity forming optics and the side pumping of the constrained gain region act in conjunction such that the fundamental transverse mode is automatically selected in the solid state laser.

32 Claims, 6 Drawing Sheets

Fundamental Transverse Mode Volume

METHOD FOR DESIGN AND CONSTRUCTION OF EFFICIENT, FUNDAMENTAL TRANSVERSE MODE SELECTED, DIODE PUMPED, SOLID STATE LASERS

ORIGIN OF THE INVENTION

The invention described herein was made by employees of the United States Government, and may be manufactured and used by or for the Government for governmental purposes without the payment of any royalties thereon or therefor.

TECHNICAL FIELD

This invention relates to lasers in general and in particular to a method of designing and constructing a diode pumped (side pumped) solid state laser that is rugged, efficient, and automatically fundamental transverse mode ($TEM_{00}$) selected.

BACKGROUND ART

Previous methods of pumping a solid state laser gain medium include side pumping with diode bars or flash lamps and longitudinally pumping the solid state laser gain medium with another laser or with laser diodes. In a typical side pumped laser, the entire solid state gain medium is pumped and the gain medium is larger (spatially) than the fundamental transverse mode volume of the laser gain medium. In order to ensure operation in the fundamental transverse mode ($TEM_{00}$), an intra-cavity aperture is required. This intracavity aperture typically induces substantial loss in energy or power, and can reduce the beam quality due to the effects of diffraction around the aperture.

In diode laser end-pumping (longitudinal pumping), the beam from a group of single element cw diodes are circularized and focused down the longitudinal axis of the laser crystal such that there is a high degree of overlap between the region pumped by the diodes and the fundamental transverse mode volume of the crystal. The crystal is typically longer than the absorption depth, leading to almost complete absorption of the pump beam. This fact, combined with the high degree of overlap with the fundamental transverse mode volume in end-pumped geometries, has lead to the highest reported slope efficiency of any laser. Progress in the construction of single element diodes, however, has not yielded the high power diffraction limited beams necessary to make high power end pumped solid state lasers. Currently, semiconductor master oscillator, power amplifiers are the highest power devices available that readily lend themselves to end pumping of solid state lasers. These devices, which rely on an index guided master oscillator are currently commercially available with only 1 or 2 watts average power.

The above constraints have lead laser engineers and researchers to end-pump laser crystals using gain guided, quasi-cw laser diode bars whose peak powers now exceed 100 watts. These laser diode bars are typically 1 cm long with a 1 µm junction width leading to beam divergences on the order of 10×45 degrees, respectively. These numbers make it very difficult to collimate and circularize the laser diode beams such that they are smaller than the fundamental transverse mode volume of the solid state laser crystal to be pumped. Also, when quasi-cw diode bars are used to end-pump, they require at least two optical elements to obtain suitable beam quality. This leads to an inefficient and less rugged delivery of the pump light beam to the laser gain medium.

STATEMENT OF THE INVENTION

It is therefore an object of the present invention to provide a method for the design and the construction of an efficient, fundamental transverse mode selected, diode pumped, solid state laser.

This and other objects are achieved by providing a method for designing and constructing a laser diode pumped laser system that is rugged, efficient and automatically fundamental transverse mode ($TEM_{00}$) selected. Our method utilizes the fact that if the gain region is smaller than the $TEM_{00}$ laser mode volume, fundamental transverse mode selection can be ensured. In many cases, the gain region is smaller than the fundamental transverse mode volume in only one axis. It is for this case that we have presented a design to ensure high performance. The resulting compact, efficient, and portable laser systems will have potential medical and industrial uses, as well as immediate applications to NASA's LADAR and LIDAR systems.

BRIEF DESCRIPTION OF THE DRAWINGS

FIG. 1b is an end view of the laser gain element of FIG. 1a.

FIG. 2b is an end view of the laser gain element of FIG. 2a.

FIG. 2c is a schematic of the cavity layout used with the laser system embodiment shown in FIG. 2a.

FIG. 3 is a schematic of the cavity layout used with the laser system embodiment of FIG. 1a.

FIG. 6b is a side view of the embodiment of FIG. 6a.

DETAILED DESCRIPTION OF THE INVENTION

Figure 1A:
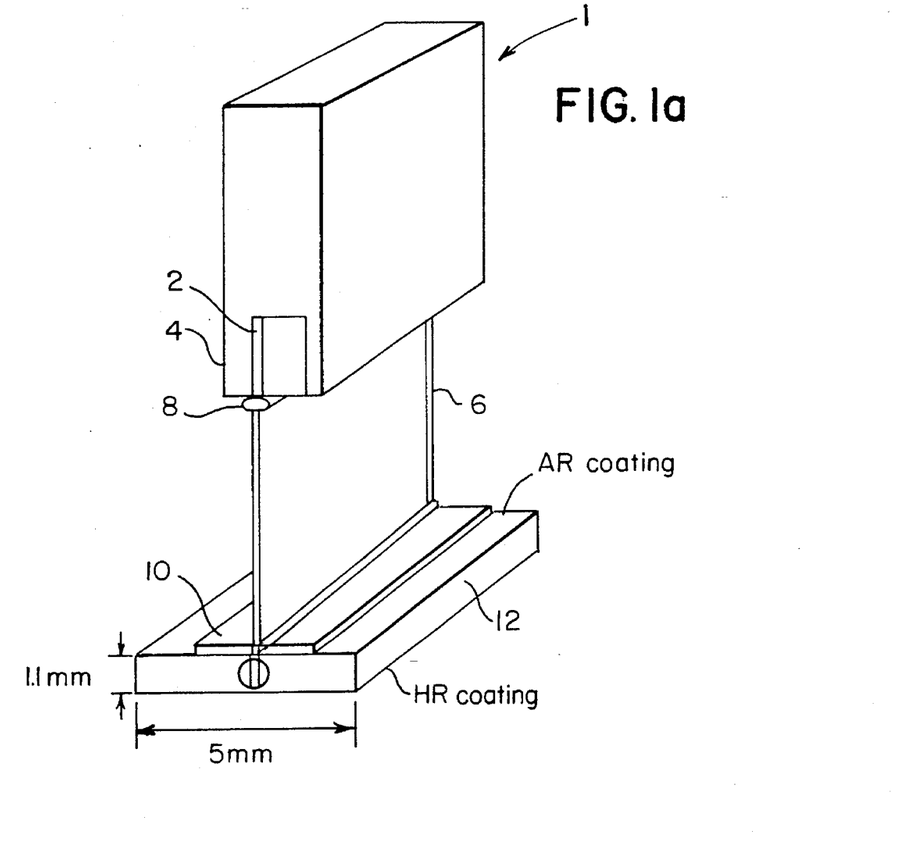
FIG. 1a is a perspective view of one embodiment of a laser diode pump which is pumping a solid state laser gain element according to the teachings of the present inventive method.

The present invention presents a way to circumvent many of the problems associated with longitudinal (or end) pumping by side-pumping a "constrained" gain region in the laser gain medium. By "constrained" we mean that although the longitudinal dimensions of the gain region and the $TEM_{00}$ laser mode volume in the laser medium are the same, the cross-sectional dimensions of the gain region are smaller than the cross-sectional dimensions of the $TEM_{00}$ laser mode volume in the laser crystal in at least one of the two orthoganal axis; in other words, the gain region dimensions transverse to the direction of propagation of the constrained gain region being smaller in at least one axis than the fundamental transverse mode in the laser crystal. Automatic fundamental transverse mode control in the other of these two axis is accomplished by a careful design of the cavity and the solid state laser gain medium itself. A laser diode pump, its associated beam and its overlap with the $TEM_{00}$ laser mode volume is shown in FIG. 1a which is a perspective view of one embodiment of a laser diode pump 1 which is pumping a solid state laser gain element 12 according to the teachings of the present inventive method described herein. In this embodiment of laser diode pump 1, a laser diode bar 2 is attached to heat sink 4. One example of a suitable laser diode bar 2 is an SDL 3230TZS 60 W quasi-cw bar. Beam 6, emitted by laser diode bar 2, is collimated by micro-lens 8, and passes through half-wave plate 10 to laser crystal 12, which in one of our experimental models was a Brewster/Brewster Nd:YLF Slab with the dimensions shown. It is not necessary to use a Nd:YLF crystal, although we have found this type of crystal to perform very well. Half-wave plate 10 (which is not necessary to the proper functioning of this invention but is shown because it was used in one experimental model to rotate the polarization of beam 6) can be used to take advantage of the larger absorption cross-section for pump 1 light polarized parallel to the laser crystal 12 c-axis.

Figure 1B:
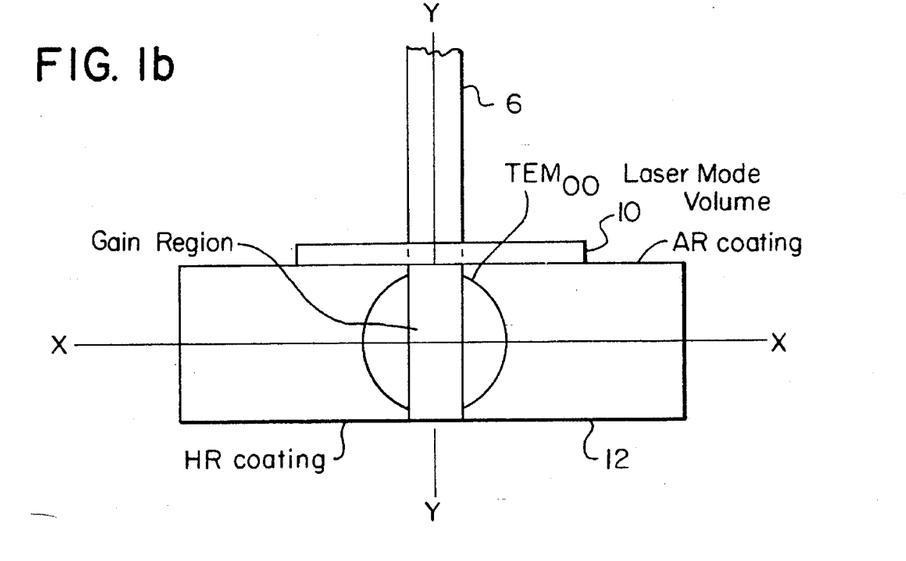

As shown in FIG. 1b, which is an end view of gain element 12, on the horizontal (X) axis, the fundamental transverse Hermite-Gaussian mode will be automatically selected because the width of the gain region excited by pump beam 6 is smaller than the width of the $TEM_{00}$ laser mode volume in crystal 12. In the vertical (Y) direction, however, the fundamental transverse mode will be selected by using gain element 12 as an aperture, that is, the fundamental transverse mode is selected in the y axis by the losses induced by the top and bottom of gain element 12. For optimum laser performance, the need for complete pump beam 6 absorption, which requires a deeper crystal 12, must be balanced against the use of the top and bottom of crystal 12 as an aperture to strip higher order modes in that axis.

As shown in FIG. 1a, one method of ensuring that the width of the gain region in crystal 12 is smaller than the width of the $TEM_{00}$ laser mode volume in the horizontal axis entails the use of a high power, quasi-cw laser diode bar 2 collimated using cylindrical micro-lens 8 developed at Lawrence Livermore National Laboratories. See U.S. Pat. Nos. 5,080,706, 5,155,631, 5,081,639 and 5,181,224, which are hereby incorporated by reference, for a complete description of these micro-lenses. These lenses reduce the divergence angle of the light beam emitted by diode bar 2 more than an order of magnitude in the fast axis and allows for a very small (<400 μm $1/e^2$ width) and collimated beam 6 at a distance of 1 cm from gain element 12.

As will be understood by one skilled in this art, in order to use gain element 12 as an aperture without suffering severe losses, the laser cavity must be designed taking into account the physical dimensions of gain medium 12. Thus, gain element 12 must be deep enough in the vertical (Y) direction to absorb a significant fraction of the energy provided by laser diode bar 2, and the cavity must be designed such that the fundamental transverse mode volume under-fills the gain region in the Y direction as shown. The effects of diffraction losses from the top and bottom of gain medium 12 can be minimized by the use of a Gaussian reflectivity mirror (GRM) 38 (shown in FIG. 3). The use of GRM 38 is not necessary, however, and fundamental transverse mode operation has been accomplished without its use. In the simplest embodiment using a GRM 38, the GRM 38 serves as the output coupler. In a GRM 38, the reflectivity decreases as a function of radial distance from the center of the mirror. This has the effect of changing the intensity profile of both the internal cavity mode volume and the output beam. The change in the profile represents a reduction of the energy in the wings (the part of the Gaussian not within the $1/e^2$ diameter) of the mode. This reduces the effects of diffraction, and yields a flatter intensity profile. The flatter intensity profile is also beneficial in that it increases the efficiency of the extraction of energy from the gain medium. One other benefit of the GRM 38 is that it increases beam pointing stability.

In summary, the advantages of the laser system shown in FIG. 1a are the facts that it utilizes high power, quasi-cw diodes, automatically selects the fundamental transverse mode, is more efficient (than traditional side pumping), reduces the number of overall optical elements required, yields better beam pointing stability, is compact, and is conductively cooled.

ALTERNATE EMBODIMENTS

Figure 2A:
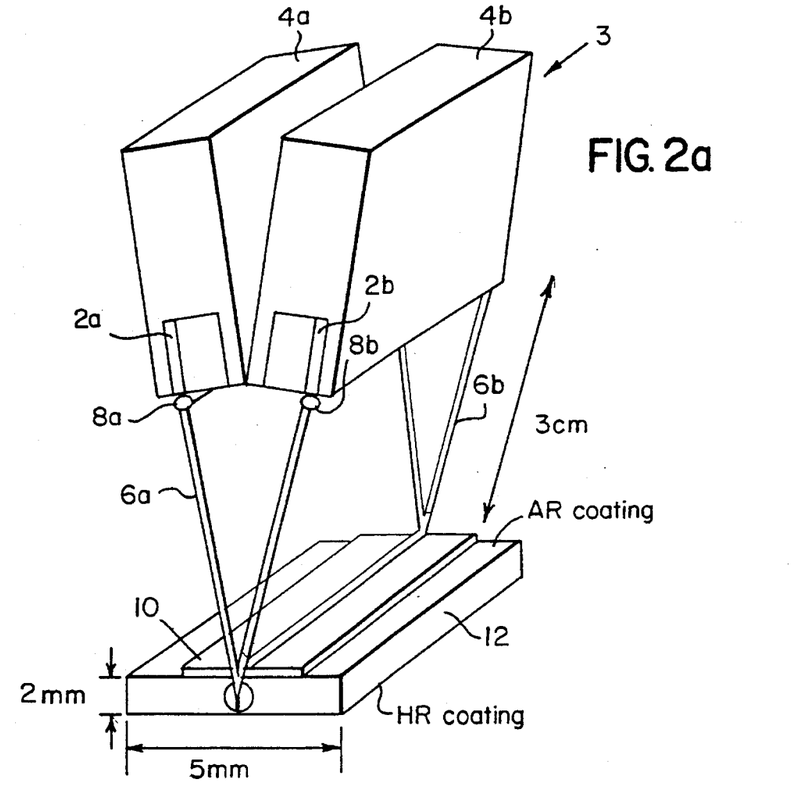
FIG. 2a is a perspective view of another embodiment of a laser diode pump which is pumping a solid state laser gain element according to the teachings of the present inventive method.
Figure 2B:
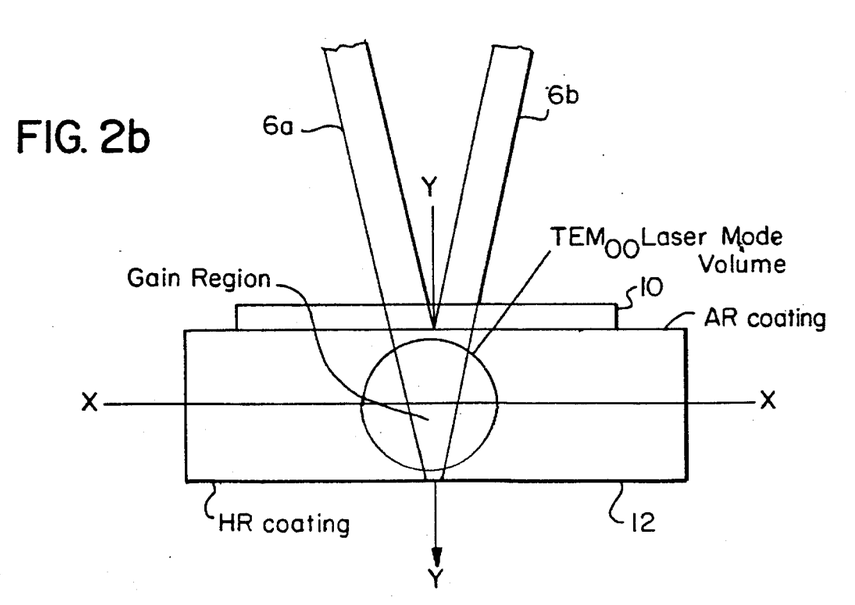
Figure 2C:
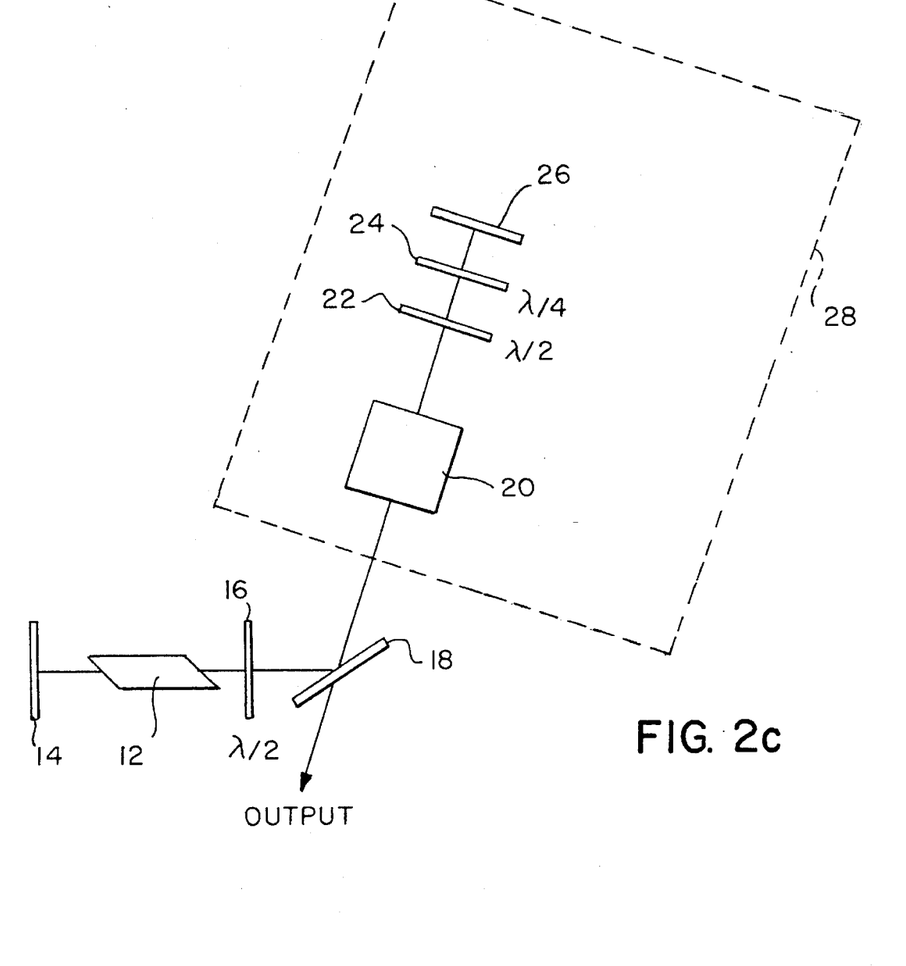

The present inventive method can be utilized in several different types of laser system configurations. One alternate embodiment, described below, is a Q-switched, cavity dumped oscillator. The pump head implementation is shown in FIGS. 2a and 2b and the cavity design is shown in FIG. 2c. In this embodiment, laser diode pump 3 consists of a pair of laser diode bars $2_a$ and $2_b$, held by a complementary pair of heat sinks $4_a$ and $4_b$. Beams $6a$ and $6b$ are each collimated by their respective micro-lenses $8_a$ and $8_b$ and pass through half-wave plate 10 (not necessary as described above) to laser crystal 12, which in one experimental model was a Brewster/Brewster Nd:YLF slab with the dimensions shown. The experimental laser system produced 4 mJ, 4.5 ns pulses with fundamental transverse mode, 1.1 times diffraction limited. In pump 3, two SDL 3230TZS 60 W quasi-cw laser diode bars $2_a$ and $2_b$, equipped with cylindrical micro-lenses $8_a$ and $8_b$, are used to pump Nd:YLF crystal 12 simultaneously as shown; although Nd:YLF performs well, other suitable crystals can be used in our design. Diode bars $2_a$ and $2_b$ were angled at approximately 10° leading to a pump beam propagation angle less than 7° in crystal 12 due to the index of refraction of Nd:YLF (n≈1.4). An angle less than 10° is possible by re-configuring the diode package (diode bars $2_a$, $2_b$ and heat sinks $4_a$, $4_b$) to reduce the 6 mm separation between the two laser diode bars $2_a$, $2_b$. To take advantage of the larger absorption cross-section for pump 3 light polarized parallel to the Nd:YLF c-axis, half-wave plate 10 was placed between collimated diodes $2_a$, $2_b$ and laser crystal 12.

Pumping with collimated laser diode beams $6_a$ and $6_b$ provides high gain and enables selection of the fundamental transverse mode without the use of an extra aperture in the cavity. This embodiment also automatically selects the fundamental transverse mode in both axis. Again, this is because the width of the gain region is smaller than the width of the $TEM_{00}$ laser mode volume in the x-axis (see FIG. 2b), while the fundamental transverse mode is selected in the y-axis by the losses induced by the top and bottom of Nd:YLF slab 12. Again, for optimum laser performance, the need for complete pump beam $6_a$, $6_b$ absorption, which requires a deeper crystal 12, must be balanced against the use of the top and bottom of slab 12 as an aperture to strip higher order modes in that axis. However, achieving this balance may be complicated by the need for a very short cavity or the effects of thermal lensing.

Due to the operating wavelength of diode bars $2_a$ and $2_b$ at room temperature, diode bar $2_a$ was temperature tuned to the Nd:YLF absorption peak at 792 nm and diode bar $2_b$ to the Nd:YLF peak at 797 nm. Diode bars $2_a$ and $Z_b$ were 1 cm long and 0.4 µm wide, and produced a beam $6_a$ and $6_b$ that diverged with an angle of 10° and 40° respectively. Diode bars $2_a$ and $2_b$ were operated for 500 µs at a pulse repetition frequency of 30 Hz. The limit to the pulse repetition frequency is the 4.8% duty cycle limit of the conductively cooled diode bars $2_a$ and $2_b$. In order to produce the desired high brightness pump 3 source, diode bars $2_a$ and $2_b$ were collimated using cylindrical microlenses $8_a$ and $8_b$ originally custom designed for Lawrence Livermore's high average power micro-channel cooled diode arrays. These high NA micro-lenses $8_a$ and $8_b$ are precision aligned (to within 1 µm in both axis) and then attached to miniature silicon braces which are in turn attached to the ceramic part of diode $2_a$, $2_b$ package. This mounting technique has proven to be mechanically stable and thermally robust.

Two different versions of micro-lens $8_a$, $8_b$ were used in this embodiment; one version on the first pump 3 built, and a newer version on the second pump 3 built. The first microlens set $8_a$, $8_b$ was 200 µm by 220 µm by 1 cm long and had three flat sides and one curved side which is hyperbolic in cross-section. Lenses $8_a$, $8_b$ had a nominal focal length of 125 µm and an index of refraction of 1.78 at 800 nm. The numerical aperture for lenses $8_a$, $8_b$ was found to be 0.4, based on tests of lenses $8_a$, $8_b$ in a double pass Michelson interferometer. Lenses $8_a$, $8_b$ were ≈91% efficient in transmission. The losses were due to Fresnel reflection at the first hyperbolic surface. Collimation of diode beams $6_a$, $6_b$ resulted in stripes of light slightly over 1 cm in length with a Gaussian cross section. Measurements of the energy in the Gaussian stripe revealed that the overall efficiency for this lens was less than 80%. Lens $8_a$, $8_b$ was not able to capture the light exiting the gain guided diode $2_a$, $2_b$ at very high angles. To improve the performance, a new version of lens $8_a$, $8_b$ was used on the second pump 3 built. This 125 µm focal length lens $8_a$, $8_b$ had a plano convex polynomial aspherical cross-section. An interferogram revealed that the diffraction limited numerical aperture of this lens was 0.6. After fabrication and AR coating, this lens $8_a$, $8_b$ had an insertion loss of only 5%, and an overall efficiency of ≈83%.

Nd:YLF slab 12 used in this embodiment was a Brewster cut parallelogram 5 mm across, 2 mm deep, and 1 cm long containing nominally 1 at. % Nd and was obtained from Lightning Optical Corporation. Nd:YLF was chosen as laser crystal 12 due to its long upper state lifetime of 525 µs, and its stimulated emission cross-section at 1.047 µm of approximately $1.87 \times 10^{19}$ cm$^2$. The c-axis of crystal 12 lies in the plane of the 5 mm×2 mm side, so that the Brewster/Brewster cut preferentially favors the 1.047 µm line. The aspect ratio of 2.5:1 was chosen to help minimize potential thermal problems. Crystal 12 was AR coated for the pump on the top 5 mm by 10 mm face and HR coated for the pump on the opposite face to double pass the pump for more complete absorption.

A cavity design that we used with pump 3, shown schematically in FIG. 2c, was 50 cm in length and had a flat high reflector 14 and a 4 meter radius of curvature high reflector 26. Other cavity designs are possible as long as they comply with our above stated conditions. In the cavity shown, thin film polarizer (TFP) 18 was used in reflection in order to take advantage of the small (≈1%) single pass loss when used in this mode. In order to operate laser crystal 12 in the pulse transmission mode, the FIG. 2c cavity was configured with a Pockel's cell 20 placed after TFP 18 in switch arm 28, and required a $-\lambda/4$ retardation immediately following it; we used an equivalent retardation of $3\lambda/4$ in the form of half wave plate 22 and quarter wave plate 24 appropriately aligned.

Figure 3:
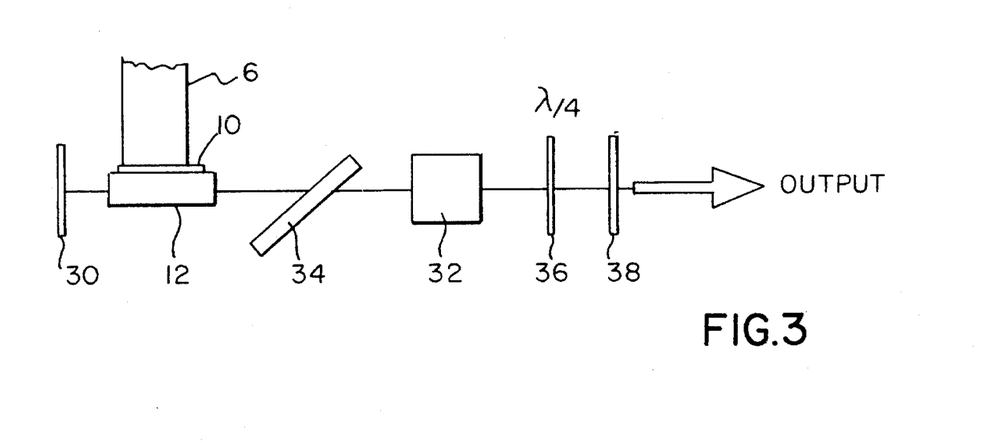

Another alternate embodiment, the cavity of which is shown in FIG. 3, is used in a high repetition rate Q-switched oscillator. The pump head (not shown) is the same as shown in FIG. 1a. Gain medium 12 is an Nd:YLF crystal operating with $E_{laser}$ parallel to the c-axis such that it lases on the 1.047 µm line. The single pump diode is collimated and forms a 1 cm long beam 6 with gaussian cross-section approximately 400 µm wide ($1/e^2$ width). In order to absorb 80% of the pump light beam 6 (assuming a gain guided pump diode with $\Delta\lambda=2$ nm) requires pump diodes at 792 nm with the pump light polarized parallel to the optic axis, and an absorption depth of ≈2.2 mm. This is accomplished in this embodiment by temperature tuning the pump diode to 792 nm, using a half-wave plate 10 to rotate the polarization such that the polarization of the pump light beam 6 is parallel to the optic axis, and using 1.1 mm deep crystal 12. Crystal 12 is anti-reflection coated on the top surface for 792 nm radiation and high-reflection coated on the bottom surface to double pass the pump light beam 6 giving an effective absorption length of 2.2 mm. The double passing of pump beam 6 also makes the gain of crystal 12 more spatially uniform. The remaining components of the cavity shown in FIG. 3 are curved high reflector 30, electro-optic Q-switch 32, thin film polarizer 34, half-wave plate 36, and GRM 38. Numerical modeling of this system with a 15 cm optical cavity length predicts 2 mJ pulses with pulse widths less than 5 ns. Preliminary, un-optimized results show $TEM_{00}$ 2.0 mJ pulses, with a pulse-width of approximately 6 nS, given a 300 µS pump pulse. This means that 11% of the pump energy was converted into laser energy. The resulting electrical to optical conversion efficiency is greater than 5%.

Figure 4:
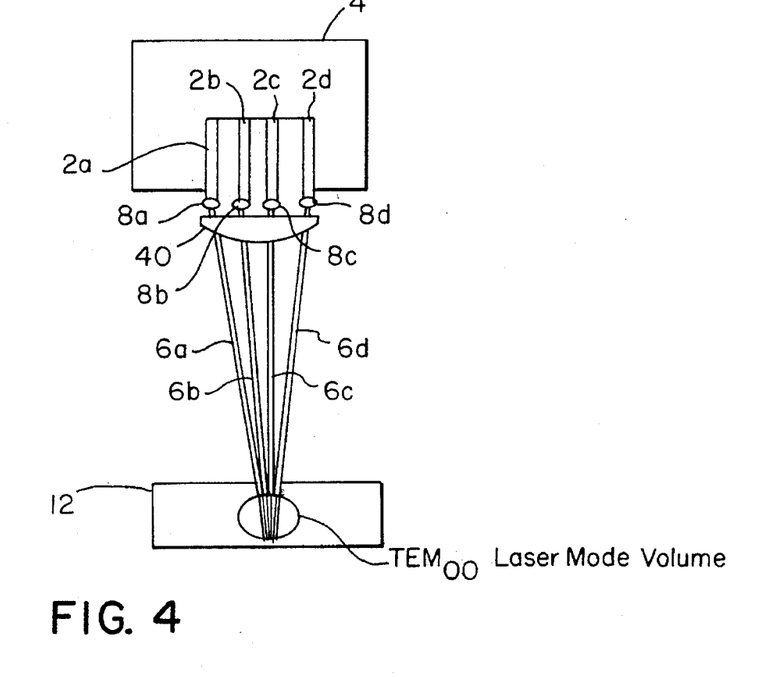
FIG. 4 is a view showing a multiple laser diode pump configuration which can be used to pump a solid state laser gain element according to the teachings of the present inventive method.

As stated earlier, our inventive method of pumping and fundamental transverse mode selecting is not limited to $Nd^{3+}$ doped crystals or to pulsed lasers. It is applicable to almost any ionic solid state laser crystal for which pump diodes exist. It is also directly applicable to cw lasers using high average power bars, and to cw and quasi-cw pumped laser amplifiers. Furthermore, this pumping method is not limited to one or two diode bars. As long as the gain region is smaller in at least one axis than the fundamental transverse mode cross-section, our method will be effective. For example, another embodiment containing a multiple pump diode configuration is shown in FIG. 4. As shown, this embodiment has four laser diode bars, $2_a$, $2_b$, $2_c$, $2_d$, mounted in heat sink 4. These four diode bars emit beams $6_a$, $6_b$, $6_c$, $6_d$, which are collimated by micro-lenses $8_a$, $8_b$, $8_c$, $8_d$, and focused by cylindrical lens 40 to laser crystal 12 below.

Figure 5:
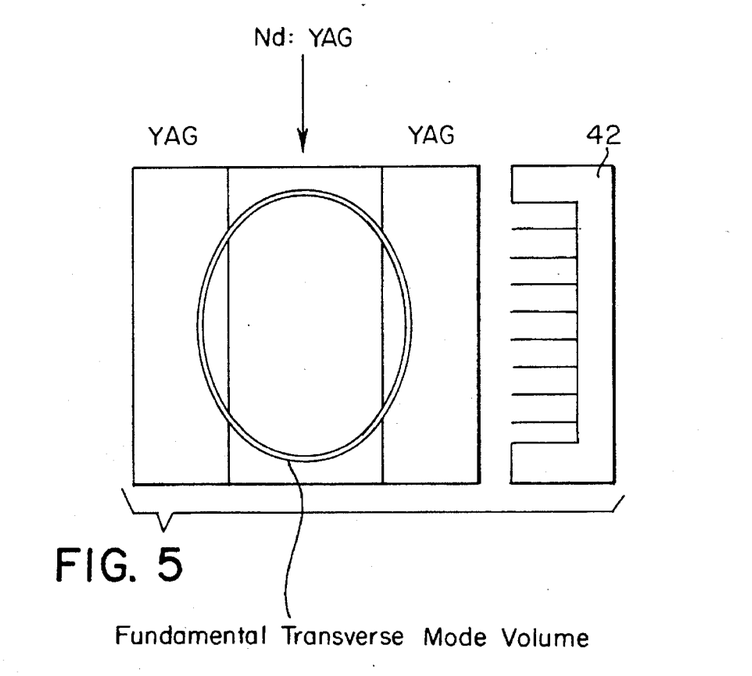
FIG. 5 is a view showing one method of construction of a solid state laser gain element having gain region that is smaller than the fundamental transverse mode volume in one axis for use in a laser system according to the teachings of the present inventive method.

Our inventive method of designing and constructing lasers described herein also does not require the use of the micro-lens collimated diodes. For example, through the use of diffusion bonded materials, our method can be scaled up to high peak and average powers. More specifically, by bonding undoped host material (e.g., YAG) with doped material (e.g., Nd:YAG) a gain region can be constructed that is smaller than the fundamental transverse mode dimensions in one axis, without suffering diffraction losses on that axis. The cavity design and gain medium dimensions are subject to the same types of constraints as discussed above. This embodiment is shown in FIG. 5 in which diode stack 42 pumps the constrained gain region.

Figure 6A:
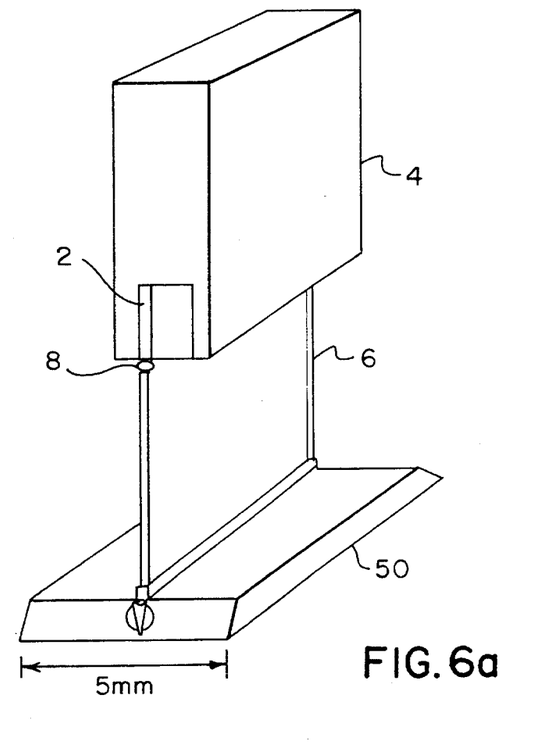
FIG. 6a is a perspective view of one alternate embodiment of a laser diode pump which is pumping a solid state laser gain element according to the teachings of the present inventive method.
Figure 6B:
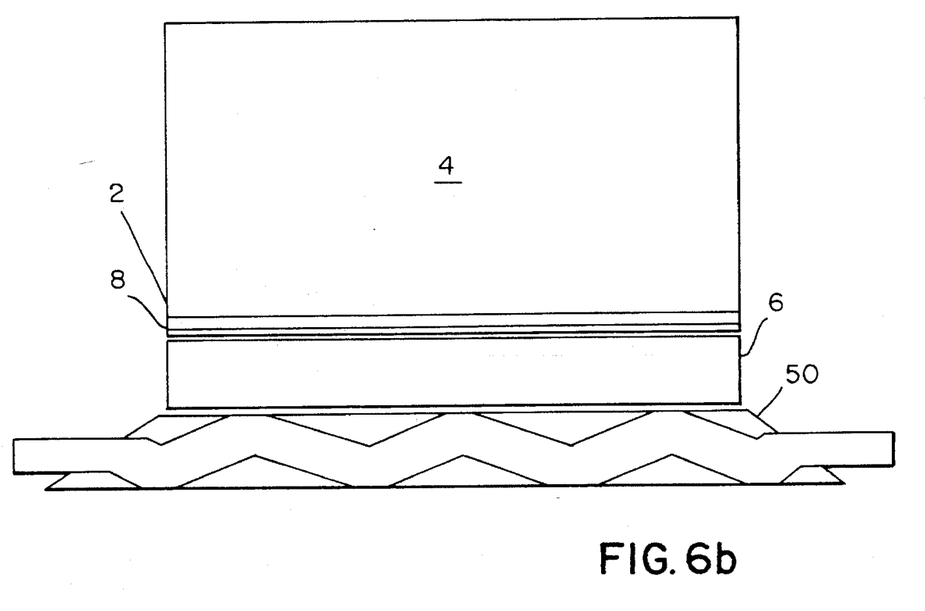

FIGS. 6a and 6b show another embodiment utilizing our disclosed pumping scheme and cavity design with a zig-zag slab 50. FIG. 6a is a perspective view of the pump and FIG. 6b is a side view. Pump beam 6 is still narrower than the $1/e^2 TEM_{00}$ diameter in at least one axis and the entrance and exit face of zig-zag slab 50 are designed to strip higher order modes on one axis. Also, zig-zag slab 50 helps minimize any thermal distortion and thermal lensing problems while allowing the $TEM_{00}$ laser mode volume to extract energy from the higher gain regions at the top of slab 50. More specifically, the $TEM_{00}$ mode volume spatially overlaps the region of slab 50 where pump beam 6 first enters the top of slab 50. Because of the decreasing exponential profile of the gain from top to bottom of slab 50 (due to Beer's law absorption), the gain is higher at the top of slab 50. The overlap of the $TEM_{00}$ laser mode volume with higher gain regions results in better extraction efficiency and higher output power.

Figure 7:
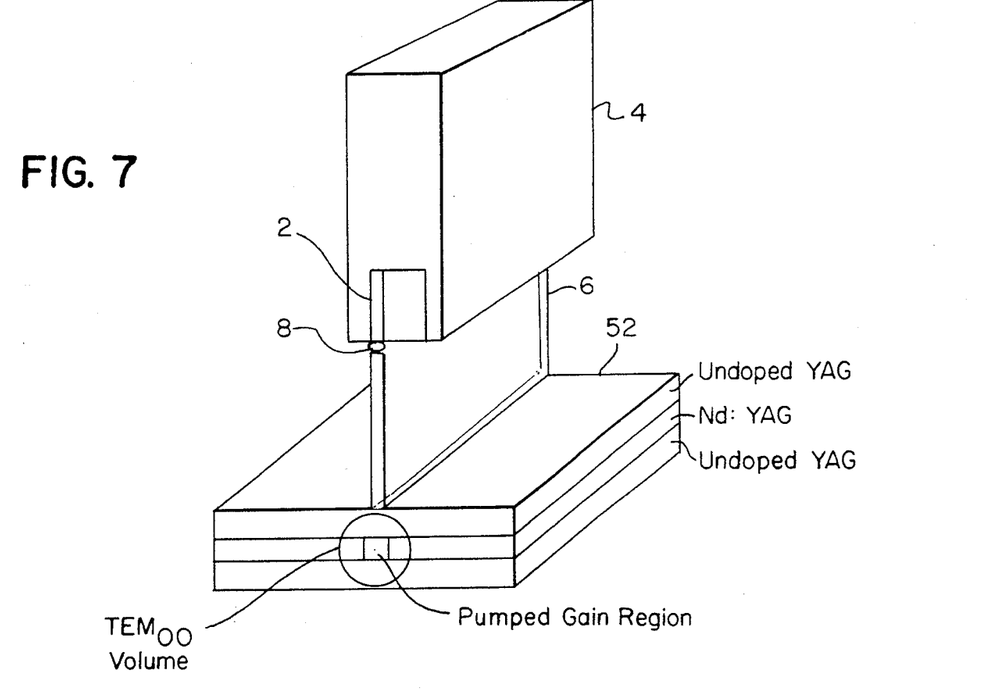
FIG. 7 is a perspective view of one alternate embodiment of a laser diode pump which is pumping a solid state laser gain element according to the teachings of the present inventive method.

Another embodiment of our device, shown in FIG. 7, uses diffusion bonded laser slabs 52. Diffusion bonded slabs are slabs made up of layers of doped and undoped host laser crystal material. As shown in FIG. 7, a laser slab 52 can be made up of three layers. The top layer is undoped YAG, the center layer is Nd:YAG, and the bottom layer is undoped YAG. Slab 52 is then pumped from the top as shown. The advantage of the diffusion bonded slab is that only the Nd doped YAG absorbs, giving precise control over the location of the gain region. This fact allows for fewer constraints on the cavity design and easier selection of $TEM_{00}$. Although FIG. 7 shows the diffusion bonded slab 52 being pumped with a micro-lens collimated diode bar 2, this is not necessary. With proper cavity design such that the $TEM_{00}$ mode volume diameter is larger than the gain region in the horizontal direction, the diffusion bonded slab could be pumped using uncollimated diode bars and still result in $TEM_{00}$ laser operation.

Figure 8:
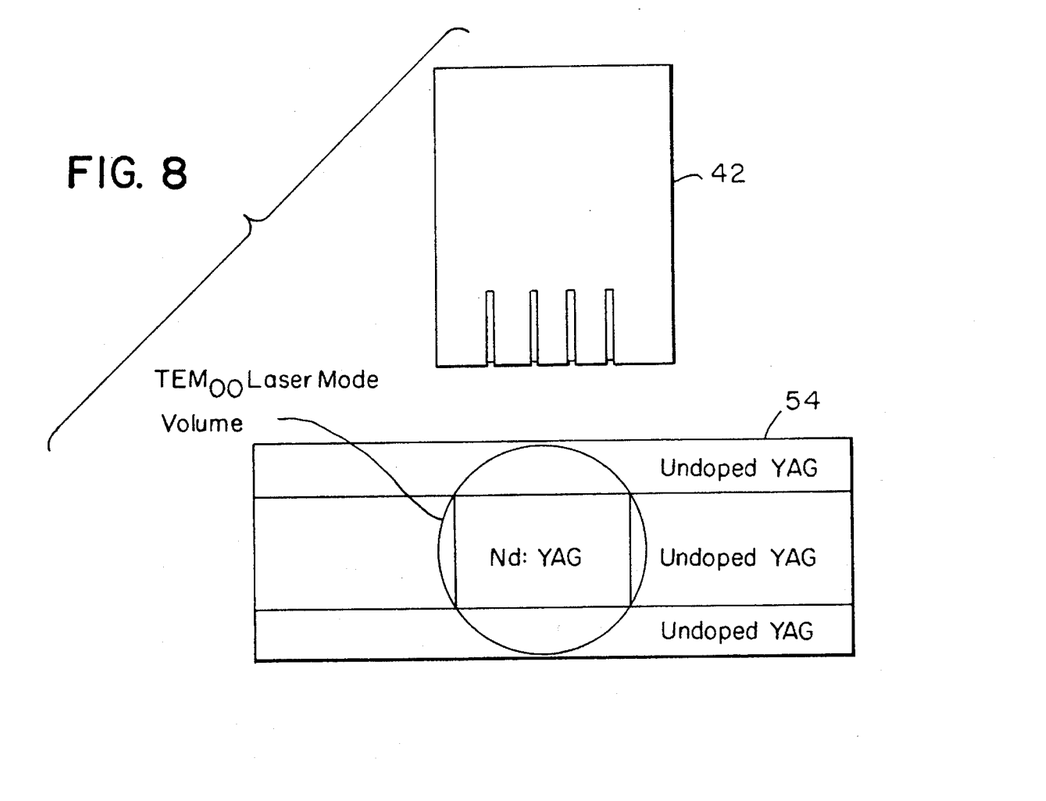
FIG. 8 is a view showing one method of construction of a solid state laser gain element having gain region that is smaller than the fundamental transverse mode volume in one axis for use in a laser system according to the teachings of the present inventive method.

A final embodiment of our system utilizes a more complicated diffusion bonded slab 54, as shown in FIG. 8. In this embodiment, only a core area of the diffusion bonded slab 54 is doped. If the cavity and diffusion bonded slab 54 are designed such that the $TEM_{00}$ mode is larger than the core gain region, $TEM_{00}$ laser operation will be ensured. This type of diffusion bonded slab 54 could be pumped with single diodes or diode stacks 42. The use of micro-lens collimated diodes would not necessarily be required.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A fundamental transverse mode selected solid state laser comprising:

a slab of laser gain material;

cavity forming means positioned around said slab of laser gain material;

means for side pumping a constrained gain region in said slab of laser gain material, the dimensions transverse to the direction of beam propagation of said constrained gain region being smaller in at least one axis than the transverse dimensions of the fundamental transverse mode volume in said laser gain material;

said cavity forming means and said means for side pumping said constrained gain region acting in conjunction such that the fundamental transverse mode is selected in said solid state laser.

2. The laser of claim 1 wherein said means for side pumping comprises laser diode pumping.

3. The laser of claim 2 wherein said laser diode pumping comprises a laser diode bar.

4. The laser of claim 3 wherein the beam emitted by said laser diode bar is collimated by a micro lens.

5. The laser of claim 4 wherein said laser diode bar is attached to a heat sink.

6. The laser of claim 2 wherein said laser diode pumping comprises a pair of laser diode bars.

7. The laser of claim 6 wherein the beams emitted by said pair of laser diode bars are each collimated by a micro lens.

8. The laser of claim 7 wherein said pair of laser diode bars are each attached to a heat sink.

9. The laser of claim 3 further comprising a half-wave plate positioned between said laser diode bar and said laser gain material.

10. The laser of claim 1 wherein said laser gain material is Nd:YLF.

11. The laser of claim 2 wherein said laser diode pumping comprises three or more laser diode bars attached to a heat sink whose beams are each collimated by micro lenses and focused on said laser gain material by a cylindrical lens.

12. The laser of claim 1 wherein said constrained gain region comprises doped host material surrounded on at least two sides by undoped host material.

13. The laser of claim 1 wherein said constrained gain region comprises doped host material surrounded on four sides by undoped host material.

14. The laser of claim 12 wherein said doped host material consists of Nd:YAG and said undoped host material consists of YAG.

15. The laser of claim 1 wherein said cavity forming means includes a Gaussian reflectivity mirror.

16. The laser of claim 1 wherein said slab of laser material comprises a zig-zag slab.

17. A method for fundamental transverse mode selection in a solid state laser comprising:

positioning a cavity forming means around a slab of laser gain material;

side pumping a constrained gain region in said slab of laser gain material with a side pumping means, the dimensions transverse to the direction of beam propagation of said constrained gain region being smaller in at least one axis than the transverse dimensions of the fundamental transverse mode volume in said laser gain material, such that said cavity forming means and said means for side pumping said constrained gain region act in conjunction such that the fundamental transverse mode is selected in said solid state laser.

18. The method of claim 17 wherein said means for side pumping comprises laser diode pumping.

19. The method of claim 18 wherein said laser diode pumping comprises a laser diode bar.

20. The method of claim 19 further comprising collimating the beam emitted by said laser diode bar by a micro lens.

21. The method of claim 20 wherein said laser diode bar is attached to a heat sink.

22. The method of claim 18 wherein said laser diode pumping comprises a pair of laser diode bars.

23. The method of claim 22 further comprising collimating the beams emitted by said pair of laser diode bars by a micro lens.

24. The method of claim 23 wherein said pair of laser diode bars are each attached to a heat sink.

25. The method of claim 19 further comprising positioning a half-wave plate between said laser diode bar and said laser gain material.

26. The method of claim 17 wherein said laser gain material is Nd:YLF.

27. The method of claim 18 wherein said laser diode pumping comprises three or more laser diode bars attached to a heat sink whose beams are each collimated by micro lenses and focused on said laser gain material by a cylindrical lens.

28. The method of claim 17 wherein said constrained gain region comprises doped host material surrounded on at least two sides by undoped host material.

29. The method of claim 17 wherein said constrained gain region comprises doped host material surrounded on four sides by undoped host material.

30. The method of claim 28 wherein said doped host material consists of Nd:YAG and said undoped host material consists of YAG.

31. The method of claim 17 wherein said cavity forming means includes a Gaussian reflectivity mirror.

32. The method of claim 17 wherein said slab of laser material comprises a zig-zag slab.

* * * * *